Patented May 27, 1947

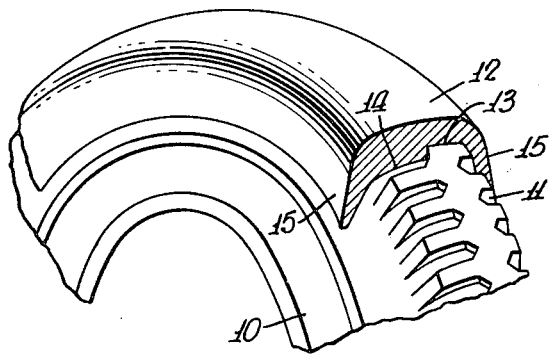
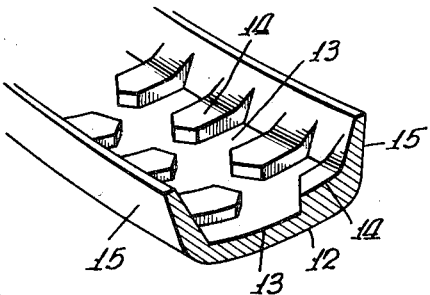
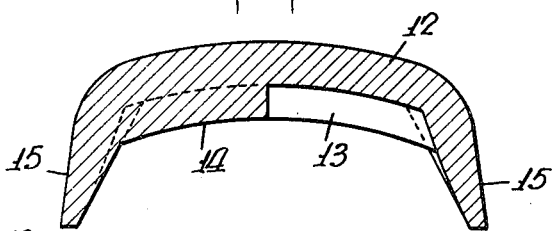
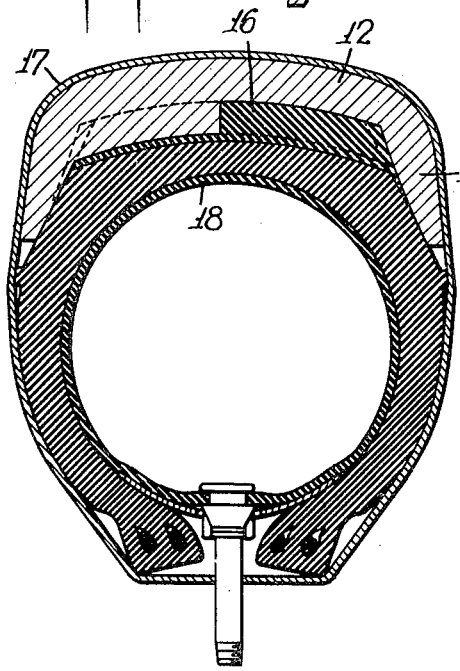
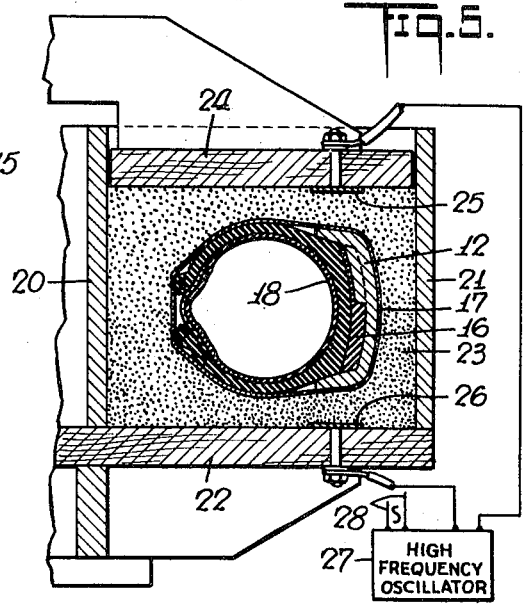

2,421,099

UNITED STATES PATENT OFFICE 2,421,099

RECAPPING OF TIRES

Clarence W. Vogt, Norwalk, Conn.

Application January 20, 1944, Serial No. 518,968

3 Claims. (Cl. 154—14)

This invention relates to the repair of vehicle tires, and more particularly to that operation commonly called recapping.

The main object of the present invention is to facilitate the proper formation of the tread projections and depressions on the outer surface of a repair band or strip of uncured or unvulcanized rubber applied along the worn tread surface and commonly called camelback and the proper retention of all portions of the camelback under uniform pressure during the vulcanizing operation.

A further object is to avoid the necessity of first forming the depressions, then filling them, and after vulcanization separately removing the filling material from each depression.

A further object is to provide a matrix which serves to form the depressions and to keep them filled and in proper shape during the vulcanizing.

A further object is to provide a method and means whereby a full thickness retread may be applied to a tire carcass which has become stretched in use.

A further object of the invention is to provide an improved means for effecting the vulcanization by the production of the desired heat throughout all portions of the unvulcanized rubber, as distinguished from the transmission of heat from the outer surface to the interior thereof. Thus, all portions of the unvulcanized rubber are properly and uniformly vulcanized without the liability of insufficiently vulcanized portions at the inner portion of the camelback and overvulcanized or case hardened portions on the outer surface.

Other advantages and objects will be apparent from or pointed out in the following description.

In the accompanying drawing, there are shown certain apparatus which may be employed in carrying out the invention.

Fig. 1 is a perspective view of a portion of a new tire with a matrix band thereon, after the formation of the latter.

Fig. 2 is a perspective view of a portion of the matrix band after being made on and removed from a new tire.

Fig. 3 is a cross-section through the matrix band.

Fig. 4 is a section of a tire with the camelback, matrix band, and wrapping thereon, and ready for vulcanization of the camelback, and Fig. 5 is a section through the tire and disposed in a heating apparatus for the vulcanization of the camelback.

In carrying out my invention I employ a band of resilient and preferably slightly stretchable material which has its inner surface serving as a matrix or mold for the outer or tread surface of the camelback during the vulcanization, and is readily removable after vulcanization.

Although the matrix band above referred to may be formed of vulcanized rubber, this is not essential, as it may be formed of other plastic material molded to the proper form, and set or hardened so that it will not be changed materially by the heat applied in the use of the band in recaping operations.

In forming the band, a new tire 10 may be employed as a matrix or mold for imparting to the inner surface of the band the proper contour. Soft plastic material of the desired composition may be applied to the periphery of the new tire after the latter has been painted or coated with any suitable material such as powdered talc, which will prevent the plastic from adhering to the tire. The plastic is properly worked and pressed into place so as to completely fill all of the depressions 11 on the tread surface of the tire and to form the body portion 12 of the band of the desired thickness. In this molding operation the inner surface of the matrix band will have formed therein depressions 13 and projections 14 which are the intaglio of those on the tire. Preferably the outer surface of the plastic is made smooth, and transversely curved. In molding the plastic there are preferably formed inwardly extending opposite flanges or side walls 15 extending a short distance radially along the outer surface of the tire.

The molded plastic material and the tire may be then tightly wrapped with a spirally applied tape so as to hold the material in place, in its properly molded form, and under pressure. If desired, the material may be applied and the tire wrapped while partly deflated, and then be fully inflated to insure proper pressure by the tape. The molded material is then vulcanized or otherwise heat-treated so as to form a firm, solid, but somewhat resilient and preferably somewhat stretchable matrix band encircling the tire along the tread, and with the inner surface conforming to the configuration of the tread of the new tire.

The matrix band need not necessarily be slightly expansible, but it is preferable that it should be, so that the full depth of retread can be applied to an old tire which has expanded to somewhat larger diameter by stretching of the walls due to continual flexing during use under load. By applying to such an old, expanded tire, a camelback of the required thickness for a full depth of retread, the matrix band may stretch the required amount under the force applied in inflating the wrapped tire, as the camelback material is confined between the matrix band and the old tire, and cannot escape.

The vulcanization or heating may be effected in various ways, but preferably by the action of a high frequency electrostatic field produced between spaced parallel electrodes disposed opposite to the lateral sides of the band. Suitable apparatus for effecting such heating will be described more fully hereinafter in connection with the operation of recapping a worn tire.

After curing of the matrix band and preferably after it has cooled, it may be removed from the new tire, and is ready for use in connection with the recapping of a worn tire. The removal may be effected by placing the tire on a "full circle" tire spreader of a type commonly used in tire factories, and which will pull the beads apart axially of the tire and thereby draw the tread portion of the tire inward radially and away from the encircling matrix band. Thus the matrix band may be readily slipped off and be ready for use in the recapping of tires, and to form tread surfaces duplicating that of the new tire used as a mold in making the matrix.

It will of course be understood that the tread pattern shown in Fig. 1 is merely a typical one, and that a new tire having any one of a wide variety of ground gripping surfaces may be used, and that a large number of the matrix bands may be made from different sizes and shapes of tires for use in the recapping of corresponding sizes and shapes of tires and tread surfaces.

In the recapping of a tire, the surface to which the camelback is to be applied is treated in the usual way, including the application of a suitable rubber cement. After the solvent of the cement has largely evaporated, the camelback 16 is applied. It may be of uncured natural rubber, a rubber composition or any synthetic rubber or other composition suitable for the purpose. The camelback is pressed tightly in place and worked to the desired shape, but not ordinarily to form any depressions or projections on the outer surface. The thickness of the camelback should be such as will give the desired depth of retread and permit its outer surface to be molded later by engagement with the matrix band.

The matrix band may be applied in any suitable way, as for instance by reversing the operation above described for the removal of the matrix band from the new tire on which it was made. That is, the tire with the camelback thereon, may be put on a full circle tire spreader, the beads pulled apart to draw the tread and camelback inwardly, the matrix band placed in position around the tire, and the tire spreader released and removed. Thus the tire in resuming its normal shape will force the camelback out into the matrix band, and the outer surface of the soft material of the camelback will be forced into the depressions on the inner surface of the matrix band. Thus the outer surface of the camelback will assume the configuration desired for the repaired tire.

The tire, camelback and matrix band are then tightly wrapped with tape 17 to further force the camelback material into the matrix band. Preferably an ordinary inner tube 18 is placed in the tire before the wrapping is applied, and after the wrapping is in place the tube is inflated to such pressure as will further insure that the outer surface of the camelback material, upon heating and softening, completely fills the depressions of the matrix band. If desired, the matrix band may have formed therein small holes opposite the several depressions, to permit the escape of any air which may have been trapped or pocketed in the depressions. Also, the outer surface of the camelback or the inner surface of the matrix band is dusted or lightly coated with talc or other suitable material before the surfaces are brought together, to avoid the possibility of any portion of either surface becoming stuck to the other during the subsequent vulcanization.

The vulcanizing may be effected in the conventional way by heating, but preferably the heating is done in a high frequency electrostatic field.

In Fig. 5 there is shown an apparatus which may be employed for effecting the vulcanizing of the camelback. The apparatus includes a wooden box having annular inner and outer walls 20 and 21, and a bottom wall 22, forming an annular chamber of somewhat larger size than the tire. The box is partly filled with a suitable dielectric material 23 which is readily deformable, and which may be dry sand. The tire is then placed in position, and further dielectric material is put in to substantially fill the space around the tire in the chamber, and to support the tire approximately midway between the bottom wall 22 and an annular cover 24. The cover may be pressed down, and if desired locked down, to hold the dielectric material under pressure and hold the tire in proper position. The top and bottom walls are provided with annular electrodes 25 and 26, which are preferably in the form of flat metal strips disposed in parallel planes and directly opposite to each other. These are of a width approximately equal to the total width of the camelback, and are so positioned that the camelback is disposed between the two electrodes. These electrodes are connected to a suitable source of high frequency electric current, as for instance, that produced by a high frequency oscillator 27 receiving alternating current through lead lines 28. This unit is not illustrated in detail, as it may be of any suitable type which will produce a current having a frequency of preferably 25 to 40 megacycles, and of sufficient kw. to produce the desired heat effect when the circuit is closed.

The entire vulcanization of the camelback will be uniform throughout all portions thereof, and the camelback will be firmly and permanently connected to the body of the tire. The time required is only a comparatively few minutes with the proper current, but the time will obviously vary with the kw. employed.

When the heat and pressure have been supplied for a sufficient time and to the proper degree to effect vulcanization, the circuit is broken, the cover 24 removed, and the tire taken out. After cooling and removing the wrapping, the matrix band may be removed from the tire in the same way that it was removed from the new tire on which it was made, and the recapped tire will be in condition for immediate use. Preferably the new tread should not be disturbed or distorted while hot. The camelback and wrapping may be reused in the recapping of another tire.

As the camelback is uniformly heated and vulcanized throughout, there will be a firm adherence to the carcass of the tire. There will be no case hardening on the surface. The time of heating may be very short and the recapping effected at low cost.

Having thus described my invention, what I claim as new and desire to secure by Letters Patent is:

1. The process of recapping a worn tire, which includes applying to the tread of the tire a layer of vulcanizable plastic material, applying around said layer an endless one piece, resilient, stretchable matrix band made of dielectric material and presenting the complete intaglio of the tread design to be formed on said tire, compressing said layer between said tread and said band, enclosing said tire and band in a substantially tight and substantially non-stretching flexible casing, inflating a tube within said tire, placing said enclosed tire between a pair of substantially parallel electrode plates and vulcanizing said layer by forming a high frequency electrostatic field between said electrodes.

2. The process of recapping a worn tire which includes applying a camelback thereto, applying around said camelback an endless one piece, non-metallic, stretchable matrix band of plastic dielectric material presenting the complete intaglio of the tread to be formed on said tire, encasing the tire and band in a substantially non-stretching flexible casing and vulcanizing said camelback by the action of a high frequency electrostatic field.

3. The process of recapping a worn tire which includes applying a camelback to the tread surface, compressing said camelback between said tread surface and a one-piece, non-metallic stretchable matrix band of dielectric material having side flanges, and presenting the complete intaglio of the tread to be formed on said tire, binding the band on to the tire and camelback by wrapping tape around the tire and band and thereby limiting the stretching of said matrix band and holding the flanges of the band against the sides of the tire, and vulcanizing said camelback by the action of a high frequency electrostatic field.

CLARENCE W. VOGT.

REFERENCES CITED

The following references are of record in the file of this patent:

UNITED STATES PATENTS

| Number | Name | Date |
| --- | --- | --- |
| 2,014,010 | Wheatley | Sept. 10, 1935 |
| 2,110,293 | Fisher | Mar. 8, 1938 |
| 1,527,206 | Marquette | Feb. 24, 1925 |
| 1,634,106 | Hopkinson | June 28, 1927 |
| 1,691,756 | Campbell | Nov. 13, 1928 |
| 1,813,880 | Kraft | July 7, 1931 |
| 2,147,218 | Reimel | Feb. 14, 1939 |
| 2,341,617 | Hull | Feb. 15, 1944 |
| 2,280,771 | Dufour et al. | Apr. 28, 1942 |
| 1,216,654 | Burke | Feb. 20, 1917 |
| 1,306,602 | McEwen | June 10, 1919 |
| 2,100,478 | Grange | Nov. 30, 1937 |
| 2,282,578 | Hawkinson | May 12, 1942 |
| 1,566,500 | Northrup | Dec. 22, 1925 |
| 882,341 | Pepper | Mar. 17, 1908 |
| 1,162,397 | Price | Nov. 30, 1915 |
| 1,428,382 | Marquette | Sept. 5, 1922 |